Patented Oct. 21, 1952

2,614,994

UNITED STATES PATENT OFFICE 2,614,994

PREPARATION OF SILICA SOLS FROM FINELY DIVIDED SILICON

Joseph H. Balthis, Mendenhall, Pa., assignor to E. I. du Pont de Nemours & Company, Wilmington, Del., a corporation of Delaware No Drawing. Application January 16, 1950, Serial No. 138,935

4 Claims. (Cl. 252—313)

This invention relates to silica sols and more particularly to a new method of preparing silica sols in which elemental silicon is reacted with an aqueous solution of a water-soluble amine of $pK_a$ value of 6 to 12, and to the so-produced, novel silica sols which are stabilized with such amines and contain silica particles from 80 to 150 Angstroms in diameter.

Aqueous silica sols are of considerable technical importance, for example in the treatment of hosiery to impart snag resistance, as fillers for white rubber, nonskid adjuvants to waxes, textile sizing and finishing agents, ingredients in emulsifying agents, and in many other applications, and the sols of the present invention are similarly applicable. Prior sols have generally been prepared from sodium silicate by treatment with acids or ion-exchange resins. No method to prepare silica sols directly from silicon has heretofore been known.

This invention has as an object a new method for preparing silica sols. A further object is a method by means of which silica sols are easily and economically obtained from metallic silicon. A still further object is a method for preparing silica sols which is convenient in practice and which yields silica sols of high concentration and of controllable particle size. Another object is to provide novel silica sols which are substantially free of metal ions, contain silica particles from 80 to 150 Angstroms in diameter, and are transparent and clear, even at high solids contents. Other objects will appear hereinafter.

The above objects are accomplished by processes comprising reacting finely divided, silicon metal with an aqueous solution of a water-soluble amine having a basicity, as expressed by its $pK_a$ value at 20–25° C., between 6 and 12, whereby hydrogen is evolved and metallic silicon is converted to a stable colloidal suspension of silicon dioxide, and are further accomplished by novel silica sols which may be prepared by the foregoing processes and which are substantially free of metal ions, contain silica particles from 80 to 150 Angstroms in diameter, are clear and transparent even at high solids contents, and contain a water-soluble amine having a $pK_a$ value from 6 to 12.

It is known that the basicity of organic bases is best expressed by their $pK_a$ value. The expression $pK_a$ stands for the negative logarithm of the acidity constant. An excellent discussion of basicity and its measurement is given by Adrien Albert in Chemistry and Industry for January 25, 1947, pages 51–55, citing many references. The agents suitable for conversion of silicon to silica in the process of this invention are the amines having a $pK_a$ value between 6 and 12, measured at temperatures between 20 and 25° C. The $pK_a$ value varies with the temperature, but only to a negligible extent between 20 and 25° C. These amines appear to act somewhat in the manner of catalysts since the reaction actually takes place between the silicon and the water present. The amines do not combine to any significant extent with the silica as it is formed, but rather, the silica particles grow to a size of from 80 to 150 Angstroms substantially as pure silica.

It is in general preferable, although not essential, to use preactivated silicon. There are various ways of activating the metal so that it becomes more susceptible to reaction with water in the presence of amines, but in all cases it is believed that the activating treatment removes a film of silicon dioxide from the surface of the particles and exposes a clean metal surface. The preactivation treatment may be carried out, for example, by washing the metal (preferably in a finely divided form) with aqueous hydrofluoric acid, the latter being suitably at concentrations between 1 and 48%, or with aqueous solutions of ammonium bifluoride; or by carrying out the reaction between the silicon and the aqueous amine solution in a vented ball mill wherein the metal is subjected to continuous grinding; or less effectively by grinding the metal, mechanically or otherwise, just prior to use in the reaction; or by a combination of these methods. It is preferred that the silicon metal be reduced to a small particle size, e. g., between 80 and 320 mesh or finer. Larger particles will react, but more slowly. Freshly ground silicon is more reactive when prepared from relatively large particles, e. g., particles the size of a pea or a marble, than from coarse powders, probably because there is less initial superficial silica. In addition to elementary silicon, it is possible to use silicon alloys such as ferro-silicon containing 90% or more silicon.

The reaction proceeds when the amine concentration in the water is as low as 0.25% by weight and even lower. It may be as high as 40% or even more. The preferred range of concentration of amine in water is between 1 and 35% by weight. It is in general desirable to use between 0.05 and 15 moles of amine per gram-atom of silicon, the preferred range being between 0.2 and 5 moles of amine per gram-atom of silicon.

The reaction temperature is not critical, as the reaction proceeds even at temperatures as low as 0° C. However, the rate of reaction increases with increasing temperature and it is preferred to operate at temperatures between 20° and 100° C. Higher temperatures, e. g., 100–150° C., can be used in pressure equipment.

Agitation during the reaction is not essential but it is desirable, as the rate and extent of reaction are increased thereby. Agitation can be combined with grinding, as when the reaction is carried out in a ball mill. Continuous or semi-continuous operation is possible by withdrawing the sol continuously and adding more amine as required.

The progress of the reaction can be followed by the gradual disappearance of the metallic silicon and the rate of evolution of hydrogen. In general, an induction period is observed, after which the reaction starts and increases in rate, then becomes slower, possibly because film of silica is deposited on the unreacted silicon. Thus, it is often advantageous to interrupt the process when one-third to two-thirds of the silicon has reacted and to recover the unreacted metal by filtration or centrifugation. Depending on conditions such as temperature or extent of activation of the metal, substantial conversion to silica occurs within about 4 to 24 hours from the start of the reaction or even less. It is in general desirable to carry out the reaction until at least 10% of the silicon has been converted to silica.

The amines employed for the reaction can be readily expelled from the sol by boiling if it is volatile, e. g., if it boils below 100° C., and such low boiling amines are preferred when the contemplated use requires the final silica sol to be free of extraneous materials. Even higher boiling amines can be removed by steam distillation or by partial evaporation of the sol under reduced pressure, particularly since most amines are codistillable with water. Thus, as the final product, there may be obtained a sol containing nothing but colloidal silica particles without ions being present, other than the ammonium ions corresponding to the amine used, or at most with but traces of them. However, the amine should not be removed until the sol is about to be used, because the amine imparts additional stability to the silica sol during storage. If the presence of small amounts of such ammonium ions is not detrimental, the amine need not be removed, or it can be neutralized by addition of acid. It is sometimes desirable to add acids or non-volatile alkalies to assist in controlling the molecular weight and particle size of the silica during concentration and aging.

A number of experiments in which various amines having a basicity corresponding to a $pK_a$ between 6 and 12, caused water to react with silicon to form silica sols are tabulated below. In all cases, the silicon used was a substantially chemically pure material containing only traces of magnesium and copper by spectrographic examination. It had a conductivity of 0.01–1 reciprocal ohms/centimeter, as compared with a value of 15–30 for the best commercial products. This material was finely ground shortly before use. In each of the experiments tabulated below, 2 parts of this silicon was treated with 100 parts of an aqueous solution containing the designated amine in the specified amount. Effervescence due to hydrogen evolution started almost immediately. The reaction mixtures were allowed to stand at 20–25° C. for 2–3 days, after which the unreacted silicon, if any, was separated by filtration. The volume of the filtrate was adjusted to 100 cc. with distilled water, and solids contents were determined by evaporating small portions to dryness at 100° C.

TABLE I

*Effects of various amines on silicon*

| Experiment | Amine and Concentration by weight in water | Grams of solids per 100 cc. of sol |
|---|---|---|
| 1 | Dimethylamine, 30% | 5.22 |
| 2 | n-Butylamine, 28% | 5.10 |
| 3 | Ethylamine, 33% | 5.05 |
| 4 | Piperidine, 28% | 5.00 |
| 5 | n-Propylamine, 28% | 4.57 |
| 6 | Trimethylamine, 25% | 4.34 |
| 7 | Monoethanolamine, 28% | 3.03 |
| 8 | Hydrazine hydrate, 42% | 2.66 |
| 9 | Morpholine, 28% | 2.00 |

In all cases there was obtained a stable silica sol which could readily be concentrated. Similar results are obtained when ordinary commercial silicon is used, but the reaction may then be slow, depending in part on the extent of superficial oxidation, unless the metal is activated by one of the methods described, preferably by washing with aqueous hydrofluoric acid, or unless the treatment with the amine is carried out in a ball mill providing continuous grinding. After such a treatment the commercial material reacts at a satisfactory rate. This is shown by the following experiment.

A sample (2 parts) of commercial silicon was finely ground and immediately treated with 100 parts of an aqueous solution containing 7 parts of diethylamine for 2–3 days at 20–25° C. The resulting silica sol contained 1.789 g. of solids per 100 cc. For comparison, a sample of the same commercial silicon was finely ground, washed thoroughly with 48% aqueous hydrofluoric acid, rinsed with water, then with alcohol, then with ether and dried in a stream of nitrogen, after which a 2-part portion was treated with 7% aqueous diethylamine as above. The resulting silica sol contained 3.756 g. of solids per 100 cc.

A similar beneficial effect due to activation by hydrofluoric acid wash is observed also with extremely pure silicon such as that used for the experiments tabulated in Table I above.

In the following table are recorded experiments showing the effect of various concentrations of amine on silicon. In all cases there was used 100 parts of an aqueous solution containing diethylamine in the designated amount, and 2 parts of substantially chemically pure silicon metal having a conductivity of 0.01–1 reciprocal ohms/centimeter. This metal had been freshly ground to a fine powder. The experiments were carried out in duplicate, one set with the freshly ground metal without hydrofluoric acid wash and the other set with the freshly ground metal washed with 48% aqueous hydrofluoric acid, rinsed successively with water, alcohol and ether and dried in an atmosphere of nitrogen. Sol formation was carried out by maintaining the metal in contact with the aqueous diethylamine solution for 2–3 days at 20–25° C.

TABLE II

*Effect of various concentrations of diethylamine on silicon*

| Experiment | Diethylamine, percent by weight | Moles of diethylamine per gram-atom of silicon | Solids content of sols (g./100 cc.) |
|---|---|---|---|
| 1-A. Freshly ground | 0.35 | 0.068 | 0.883 |
| 1-B. HF washed | 0.35 | 0.068 | 1.058 |
| 2-A. Freshly ground | 1.4 | 0.27 | 1.733 |
| 2-B. HF washed | 1.4 | 0.27 | 3.191 |
| 3-A. Freshly ground | 7.1 | 1.36 | 1.416 |
| 3-B. HF washed | 7.1 | 1.36 | 3.734 |
| 4-A. Freshly ground | 19.6 | 3.8 | 0.869 |
| 4-B. HF washed | 19.6 | 3.8 | 3.897 |

It is essential that the amine employed be sufficiently basic. For example, amines such as pyridine, aniline, N-methylaniline, o-, m- and p-toluidine, alpha- and beta-naphthylamine, etc., whose $pK_a$ is below 6 are ineffective or substantially ineffective. On the other hand, highly basic materials such as benzyltrimethylammonium hydroxide and benzyltrimethylammonium butoxide whose $pK_a$ is around 14 are also ineffective, in the sense that they give a silicate solution rather than a silica sol.

Within the specified $pK_a$ limits, there may be used any amine, whether primary, secondary or tertiary, which is soluble in water to the extent of at least 1%. Additional examples of suitable amines are triethylamine, allylamine, n-amylamine, di-n-butylamine, n-hexylamine, cyclohexylamine, benzylamine, 2-methylpiperidine, diethanolamine, triethanolamine, 2-hydroxy-3-ethylpiperidine and the like. The preferred amines, for reasons of economy and availability, are the aliphatic and cycloaliphatic amines of one to eight carbon atoms, particularly those which boil below 100° C.

The novel silica sols produced by the process of this invention have particle sizes in the very low range of 80–150 Angstrom units or even lower, as measured by light scattering techniques. The particles may also be observed directly, by means of an electron microscope, and the specific surface area, $S_c$, may be calculated from data thus obtained. When this value is compared with the specific surface area as determined by nitrogen adsorption, $S_n$, fairly satisfactory agreement is found, indicating that the particles are dense in that they contain no pores penetrable by nitrogen.

The sols are very stable against gelation, the presence of even a minor proportion of the amine used in the process of their preparation contributing to this stability. The concentration of amine at the end of the reaction may thus be from as low as 0.25% by weight to as high as 40% or more, the preferred range being 1 to 35% by weight, and all, or a portion, of this amine may advantageously be left in the final product. At the concentration of silica in the reaction solution this would give between 0.05 and 15 moles of amine per gram atom of silicon, the preferred range being between .2 and 5 moles of amine per gram-atom of silicon.

The sols are in general characterized by high transparency and clarity, even at high solids contents. This property is not possessed by silica sols prepared by other methods. The sols can be concentrated without difficulty simply by boiling off part of the water. Thus, it is possible to obtain sols having solids contents as high as 20% or more.

As many apparently widely different embodiments of this invention may be made without departing from the spirit and scope thereof, it is to be understood that this invention is not limited to the specific embodiments thereof except as defined in the appended claims.

This application is a continuation-in-part of my application Ser. No. 95,370 filed May 25, 1949, now abandoned.

I claim:

1. A process for obtaining aqueous silica sols which comprises contacting at a temperature of from 0° to 150° C. finely divided silicon metal with an aqueous solution of a water-soluble amine having a basicity, as expressed by its $pK_a$ value at 20° to 25° C., between 6 and 12, and continuing the reaction until a colloidal suspension of silicon dioxide in the aqueous reaction medium is obtained, said amine being present during the reaction in amount of from 0.05 to 15 moles of amine per gram-atom of silicon, and being contained in said aqueous solution in a concentration of from 0.25% to 40% by weight of the water therein.

2. Process as set forth in claim 1 wherein said amine is from the group consisting of the water-soluble aliphatic and cycloaliphatic amines of one to eight carbon atoms.

3. A process for obtaining aqueous silica sols which comprises contacting, at a temperature of from 20° to 100° C., finely divided silicon metal with an aqueous solution of a water-soluble amine having a basicity, as expressed by its $pK_a$ value at 20° to 25° C., between 6 and 12, and continuing the reaction until a colloidal suspension of silicon dioxide in the aqueous reaction medium is obtained, said amine being present during the reaction in amount of from 0.2 to 5 moles of amine per gram-atom of silicon, and being contained in said aqueous solution in a concentration of from 1% to 35% by weight of the water therein.

4. A process for obtaining aqueous silica sols which comprises washing finely divided silicon metal with hydrofluoric acid, and then contacting, at a temperature of from 0° to 150° C., the finely divided silicon metal thus treated with an aqueous solution of a water-soluble amine having a basicity, as expressed by its $pK_a$ value at 20° to 25° C., between 6 and 12, and continuing the reaction until a colloidal suspension of silicon dioxide in the aqueous reaction medium is obtained, said amine being present during the reaction in amount of from 0.05 to 15 moles of amine per gram-atom of silicon, and being contained in said aqueous solution in a concentration of from 0.25% to 40% by weight of the water therein.

JOSEPH H. BALTHIS.

REFERENCES CITED

The following references are of record in the file of this patent:

UNITED STATES PATENTS

| Number | Name | Date |
|---|---|---|
| 2,386,337 | Moyer | Oct. 9, 1945 |

OTHER REFERENCES

Colloid Chemistry, by J. Alexander, vol. VI, Reinhold Pub. Co., N. Y., pp. 1113–1117.

Rochow, E. G.: "Chemistry of Silicones," 1946, John Wiley and Sons, Inc., New York, page 3.